US007063480B2

United States Patent
Ersoy et al.

(10) Patent No.: US 7,063,480 B2
(45) Date of Patent: Jun. 20, 2006

(54) BALL-AND-SOCKET JOINT FOR A MOTOR VEHICLE

(75) Inventors: Metin Ersoy, Walluf (DE); Joachim Spratte, Osnabrück (DE); Armin Müller, Rahden (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/467,877

(22) PCT Filed: Dec. 6, 2002

(86) PCT No.: PCT/DE02/04482

§ 371 (c)(1),
(2), (4) Date: Aug. 12, 2003

(87) PCT Pub. No.: WO03/052284

PCT Pub. Date: Jun. 26, 2003

(65) Prior Publication Data
US 2004/0067096 A1    Apr. 8, 2004

(30) Foreign Application Priority Data
Dec. 14, 2001    (DE) ............... 101 61 671

(51) Int. Cl.
F16C 11/00    (2006.01)
(52) U.S. Cl. ............... 403/132; 403/122; 403/133; 403/135
(58) Field of Classification Search ............... 403/122, 403/132, 133, 135; 280/93.511, 93.512
See application file for complete search history.

(56) References Cited

U.S. PATENT DOCUMENTS

| 4,500,867 A | 2/1985 | Ishitobi et al. |
| 6,773,197 B1 * | 8/2004 | Urbach .................. 403/135 |
| 2002/0149565 A1 | 10/2002 | Sako |
| 2004/0037619 A1 * | 2/2004 | Brunneke et al. ........... 403/122 |

FOREIGN PATENT DOCUMENTS

| DE | 101 10 738 | 11/2002 |
| EP | 0 617 260 | 9/1994 |
| EP | 0 790 512 | 8/1997 |
| JP | 62-292915 | * 12/1987 |
| JP | 11271014 | 10/1999 |
| WO | WO 01/57639 | 8/2001 |

OTHER PUBLICATIONS

Abstract: JP 62-292915 Dec. 1987 JP Musashi Seimitsu F16C Nov. 2006.*

* cited by examiner

Primary Examiner—David E. Bochna
Assistant Examiner—Michael P. Ferguson

(57) ABSTRACT

A ball-and-socket joint for a motor vehicle, especially for the chassis of the motor vehicle, is provided, wherein the ball-and-socket joint has a ball-and-socket joint housing (4) provided with a joint opening (6) as well as a ball pivot (3). The ball pivot (3) includes a joint ball (1) and a pivot (2). The ball pivot (3) is mounted with its joint ball (1) rotatably and pivotably in the ball-and-socket joint housing (4) and protrudes with its pivot (2) from the ball-and-socket joint housing (4). A separate closing element (10), which closes a mounting opening (9) provided in the ball-and-socket joint housing at least partially, and at which at least one electronic component (11) is arranged, is fastened to the ball-and-socket joint housing (4).

18 Claims, 3 Drawing Sheets

BALL-AND-SOCKET JOINT FOR A MOTOR VEHICLE

FIELD OF THE INVENTION

The present invention pertains to a ball-and-socket joint for a motor vehicle, especially for the chassis of the motor vehicle, with a ball-and-socket joint housing provided with a joint opening and with a ball pivot, which has a joint ball and a pivot and which is mounted with its joint ball rotatably and pivotably in the ball-and-socket joint housing and protrudes with its pivot through the joint opening from the ball-and-socket joint housing, to which a separate closing element that closes a mounting opening provided in the ball-and-socket joint housing at least partially is fastened.

BACKGROUND OF THE INVENTION

Such ball-and-socket joints have been known from the state of the art and as important components of wheel suspensions, vehicle axles and the connection of these axles to the vehicle body, they partly determine the function of the chassis of the motor vehicle. Each wheel of a motor vehicle is usually carried by a wheel carrier, which is connected to the vehicle body via control arms. At their ends facing the wheel carriers, the control arms frequently have ball-and-socket joints, which form the kinematic articulation points at which the control arm is articulated to the wheel carrier. Furthermore, ball-and-socket joints are also present in the area of the vehicle axles at tie rods, coupling rods, rocker pendulums, etc.

It has been required for quite some time that the behavior of the motor vehicle can be coordinated with specific driving states. For example, the rolling movement of the motor vehicle can be influenced by a two-part stabilizer, whose two parts can be pivoted in relation to one another via a hydraulic motor. Furthermore, it is possible to adjust the headlights as a function of the state of load. Besides active or passive adjusting devices, electronic components, such as measuring and evaluating means, which can detect, e.g., the current driving state or the current state of load, are also necessary for performing such an active intervention with the function of the chassis or other components of the motor vehicle as a function of the current state of the vehicle. Such measuring and evaluating means are arranged in addition to the mounting of the mechanical components forming the chassis at the automobile manufacturer.

SUMMARY OF THE INVENTION

The object of the present invention is to reduce the assembly effort for the electronic components arranged in the chassis of a motor vehicle at the automobile manufacturer.

This object is accomplished by means of a ball-and-socket joint for a motor vehicle, especially for the chassis of the motor vehicle, which has a ball-and-socket joint housing provided with a joint opening and a ball pivot, which comprises a pivot as well as a joint ball. The ball pivot is mounted with its joint ball rotatably and pivotably in the ball-and-socket joint housing and protrudes from the ball-and-socket joint housing with its pivot through the joint opening. Furthermore, a mounting opening, which is closed at least partially by a separate closing element, which is fastened to the ball-and-socket joint housing and at which at least one electronic component is arranged, is provided in the ball-and-socket joint housing.

It is possible with the ball-and-socket joint according to the present invention to avoid the separate mounting of the electronic component during the manufacture of the motor vehicle, because the electronic component is already integrated within the ball-and-socket joint. This leads to a reduction in the assembly effort and consequently to a reduction in the costs for the manufacturing process at the automobile manufacturer.

The closing element is used to close an opening of the ball-and-socket joint housing at least partially. The closing element may be designed for this purpose, e.g., as a ring, whose inner opening forms the joint opening of the ball-and-socket joint. The mounting opening is provided in this case at the ball-and-socket joint housing on the pivot side, so that the ball pivot with its ball is inserted into the housing through this mounting opening during the assembly of the ball-and-socket joint. The end of the ball-and-socket joint housing located opposite the mounting opening is usually closed completely in such an embodiment.

However, the ball-and-socket joint housing preferably has a mounting opening closed by the closing element on the side located opposite the joint opening. It is possible in this case to first introduce the ball pivot with its pivot into the housing during the assembly of the ball-and-socket joint. Furthermore, the closing element is not traversed by the ball pivot, so that a larger surface is available for arranging the at least one electronic component at the closing element.

To avoid dirt or moisture from penetrating into the interior of the ball-and-socket joint, it is advantageous for the mounting opening to be closed completely by a closing element.

The electronic component may be arranged on the side of the closing element facing away from the joint ball (on the outside). If the electronic component is arranged on the side of the closing element facing the joint ball (on the inside), it is possible in a simpler manner to protect the electronic component from environmental pollution, damage or, e.g., thermal loads.

The electronic component may be arranged as a self-contained component at the closing element. However, a design is preferred according to which a protective element, by which the closing element is covered at least partially and the electronic component is advantageously covered completely, is provided at the closing element. If the electronic component is arranged on the inner side of the closing element, the protective element may be used, e.g., to deflect lubricant, which is regularly present in a ball-and-socket joint for a motor vehicle.

If the electronic component is arranged on the outside of the closing element, the primary task of the protective element would be to deflect environmental pollutants.

The protective element may be a cover made of metal, ceramic or plastic, which is to be mounted as a separate component on the ball-and-socket joint. However, the protective element is preferably made of an electrically insulating material, e.g., plastic, and plastic leads, in particular, to a weight reduction.

A protective element made of plastic may be clamped or bonded onto the closing element.

According to another embodiment of the present invention, the material of the protective element is a plastic suitable for injection molding, so that the protective element can be injected directly on the electronic component. As a result, the need to mount the protective element is eliminated, and, furthermore, very good shielding of the electronic component can be achieved, especially against moisture.

The closing element may be manufactured as a disk or as a ring made of sheet metal. However, the closing element is preferably designed as an electronic printed circuit board itself, on which the electronic component is mounted. The electronic component can thus be soldered on the closing element in the usual manner in order to prepare, e.g., the contacting of the electronic component via the strip conductors prepared on the printed circuit board.

The closing element designed as an electronic printed circuit board may be manufactured, e.g., from hard paper or ceramic.

Furthermore, it is possible in the sense of the present invention to reinforce the outer side of the electronic printed circuit board by an additional disk or an additional ring made of sheet metal. However, the closing element designed as an electronic printed circuit board is preferably manufactured from glass fiber-reinforced plastic, which meets the requirements imposed on a closing cover of a ball-and-socket joint in the motor vehicle in terms of mechanical loadability.

The electronic printed circuit board may be provided with strip conductors arranged on the surface only. However, it is also possible to provide strip conductors in the volume of the electronic printed circuit board (multilayer).

The housing may be electrically insulated against the electronic printed circuit board. However, a direct connection between the electronic printed circuit board and the housing makes it possible to use the housing without additional cable connections as an electromagnetic shield. The housing itself may also be designed as a cooling body for the electronic component.

To detect the driving state or the state of load of a motor vehicle, the electronic component may, furthermore, be connected to a sensor arranged in or at the ball-and-socket joint housing for detecting a physical variable characterizing the state of the ball-and-socket joint, the state of the ball-and-socket joint being defined, e.g., as the current deflection and/or torsion of the ball pivot in relation to the ball-and-socket joint housing. Furthermore, forces occurring in the ball-and-socket joint may be detected by means of force sensors. It is thus possible, e.g., to infer the current distance of the wheel from the vehicle body on the basis of the detected state of the ball-and-socket joint. The state of the vehicle as a whole can also be inferred from such diagnoses.

A sensor may be arranged as a separate sensor in the ball-and-socket joint, but the sensor is preferably designed as a sensor integrated with the electronic component for reasons of saving space.

Furthermore, a plurality of electronic components forming an electronic assembly unit may be arranged at the closing element. However, the electronic component is preferably designed as an application specific integrated circuit (ASIC), so that a plurality of different electric circuits can be obtained with a single electronic component. This leads to great space savings and to a large number of possible variants of the ball-and-socket joint according to the present invention.

To enable the electronic component to send signals to the outside and to guarantee the energy supply for the electronic component, a plug electrically connected to the electronic component may be present at the closing element for connecting external devices according to a first variant.

However, it is also possible according to a second variant that a device electrically coupled with the component is arranged in the ball-and-socket joint for sending electromagnetic waves, which makes possible an exchange of information between the component and the external devices without a cable connection.

The electronic component may be connected to the power supply system of the motor vehicle via a cable connection. Furthermore, it is possible to arrange a battery in the ball-and-socket joint for supplying the electronic component with electricity. However, the energy necessary for operating the electronic component is preferably supplied to the electronic component in the form of electromagnetic waves from an external sender. A device arranged in the ball-and-socket joint for receiving electromagnetic waves, which said device may, furthermore, be provided with a storage medium for storing electricity, is arranged associated with the electronic component for this purpose. The low power consumption of the electronic component is especially advantageous in the case of this type of energy supply.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
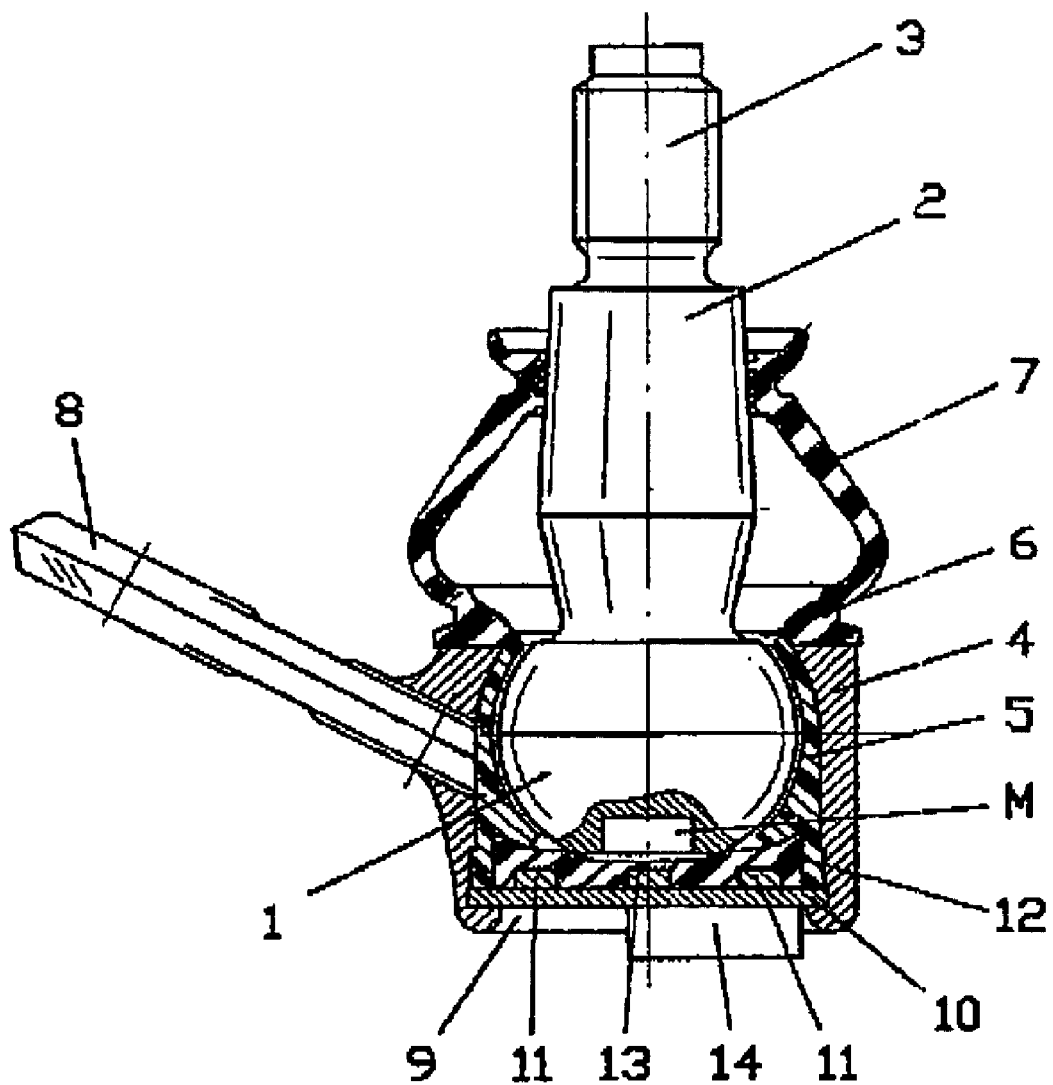
FIG. 1 is a sectional view of a first embodiment of a ball-and-socket joint according to the present invention.

Referring to the drawings in particular, FIG. 1 shows a first embodiment of the ball-and-socket joint according to the present invention, wherein a ball pivot 3 having a joint ball 1 and a pivot 2 is mounted with its joint ball 1 rotatably and pivotably in a ball-and-socket joint housing 4. The ball pivot 3 is arranged with its joint ball 1 in a bearing shell 5, which is inserted into the ball-and-socket joint housing 4 and is made of plastic, and protrudes with its pivot 2 from the ball-and-socket joint housing 4 through a joint opening 6 provided in the ball-and-socket joint housing 4.

A sealing bellows 7 made of an elastomer, which is fastened with one of its ends to the ball-and-socket joint housing 4 and is mounted slidably with its other end on the pivot 2, is provided against the penetration of dirt and moisture into the interior of the ball-and-socket joint. The interior of the ball-and-socket joint housing 4 and of the sealing bellows 7 is filled with a lubricant each, not shown, which favorably affects the mechanical behavior of the ball-and-socket joint and forms, furthermore, an additional protection against the penetration of dirt and moisture.

The ball-and-socket joint housing 4 is connected in one piece to a flange 8 and has a mounting opening 9 at its end facing away from the joint opening 6, the mounting opening 9 being closed by a closing element 10 designed as an electronic printed circuit board. To fix the closing element 10 in the housing 4, a housing edge surrounding the mounting opening 9 of the housing 4 is deformed. A plurality of electronic components 11, which are completely covered by a protective element 12 made of plastic, are arranged on the inside of the closing element 10. One of the electronic components is designed as a magnetic field sensor 13, which cooperates with a magnet M arranged in the joint ball 1. The electronic components 11, 13 are electrically connected at least indirectly to a plug 14, which is arranged on the outside of the closing element 10 and via which the electronic components 11, 13 are connected to an external device (not shown) in the ready-to-operate state. Furthermore, the electronic components 11, 13 are supplied with energy via the plug 14 during operation.

Figure 2:
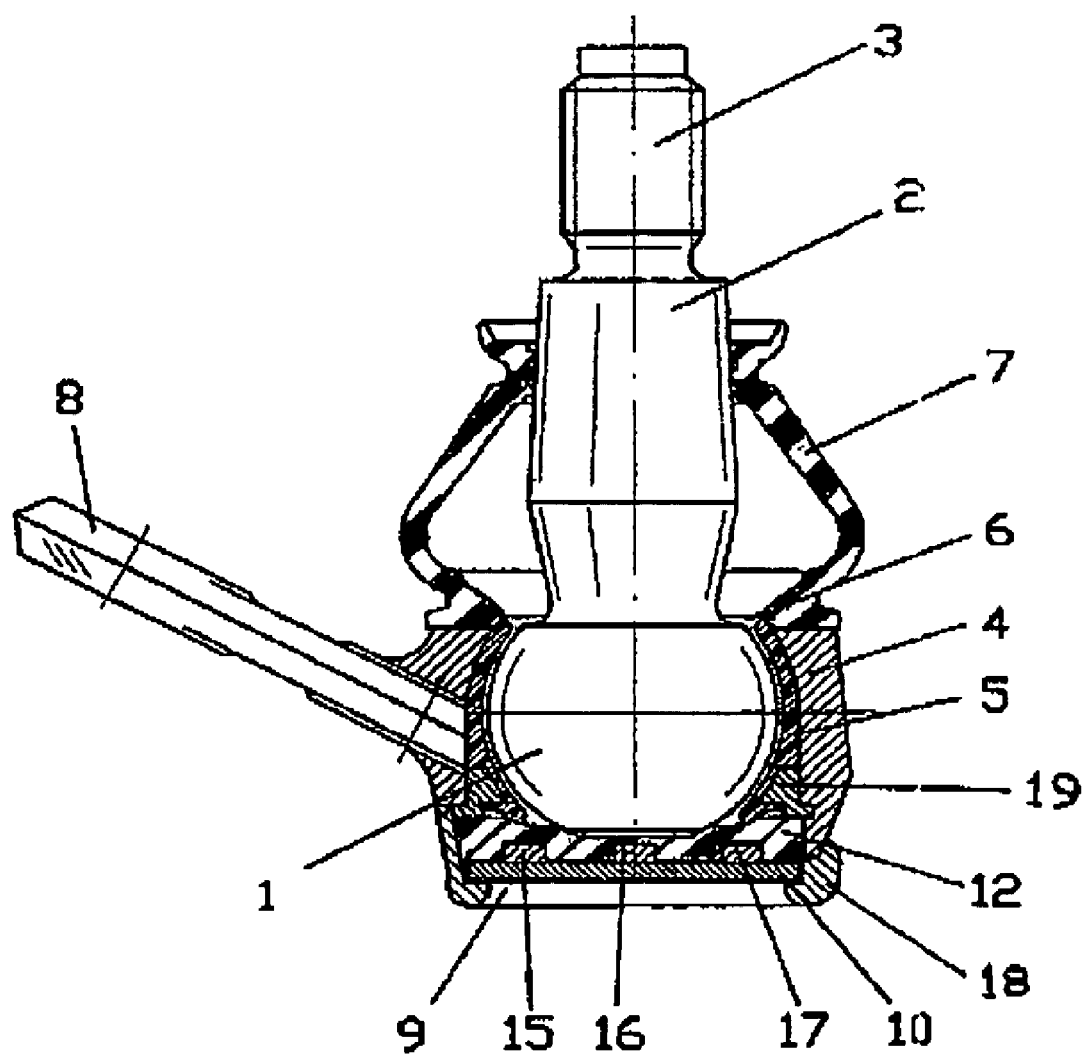
FIG. 2 is a sectional view of a second embodiment of a ball-and-socket joint according to the present invention.

FIG. 2 shows a second embodiment of the ball-and-socket joint according to the present invention, in which identical or functionally identical features are designated by the same reference numbers as in the first embodiment.

Contrary to the first embodiment, the second embodiment has no plug on the outside of the closing element 10. To nevertheless make communication possible with an external device (not shown), an electronic sending element 16 for sending information-carrying electromagnetic waves, which is electrically connected here at least indirectly to the electronic component designed as an application specific integrated circuit (ASIC) 15, is provided on the inside of the closing element 10, the electromagnetic waves being able to be received and evaluated by the external device. The external device is provided with a suitable receiver and an evaluating means for this purpose.

Furthermore, one of the electronic components is designed as a receiving element 17 for receiving information-carrying electromagnetic waves, so that a bilateral cableless exchange of information takes place according to the second embodiment between the ball-and-socket joint and the external device, which is provided with a suitable sender for this purpose.

Unlike in the first embodiment, a separate fastening rim 18, which is fastened to the housing 4 and is beaded inwardly to fix the closing element 10, is used to fix the closing element 10, rather than the housing edge surrounding the mounting opening 9. Furthermore, an insert ring 19 is provided between the bearing shell 5 and the protective element 12 to additionally support the bearing shell 5.

Figure 3:
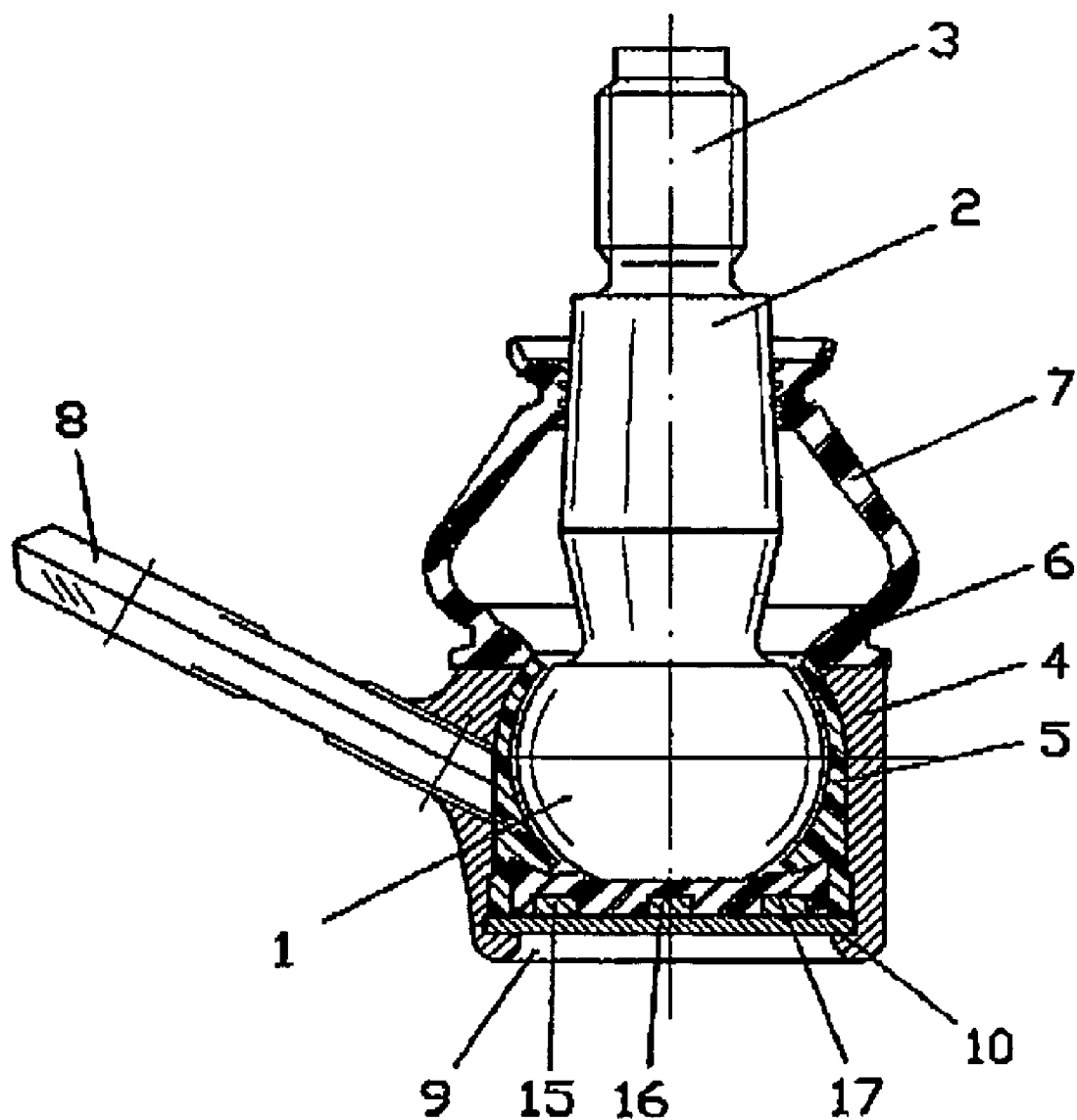
FIG. 3 is a sectional view of a third embodiment of a ball-and-socket joint according to the present invention.

FIG. 3 shows a third embodiment of the ball-and-socket joint according to the present invention, where identical or functionally identical features are designated by the same reference numbers as in the previous embodiments. The closing element 10 is fixed to the ball-and-socket joint housing 5 analogously to the first embodiment.

Contrary to the other two embodiments, the third embodiment has no protective element, so that a larger free space (which is possibly filled with a lubricant) is available between the closing element 10 and the joint ball 1 at equal dimensions. A compact design is thus possible along with a great range of pivoting for the ball pivot 3.

While specific embodiments of the invention have been shown and described in detail to illustrate the application of the principles of the invention, it will be understood that the invention may be embodied otherwise without departing from such principles.

The invention claimed is:

1. A ball-and-socket joint for a motor vehicle, comprising:
   a ball-and-socket joint housing provided with a joint opening, and with a mounting opening;
   a ball pivot having a joint ball and a pivot and mounted with said joint ball rotatably and pivotably in said ball-and-socket joint housing and protruding with said pivot through said joint opening from said ball-and-socket joint housing;
   a separate closing element, which closes said mounting opening provided in said ball-and-socket joint housing; and
   an electronic component arranged at said closing element, wherein said electronic component is electrically connected to a sensor arranged in said ball-and-socket joint housing for detecting a physical variable characterizing the state of the ball-and-socket joint.

2. A ball-and-socket joint in accordance with claim 1, wherein said mounting opening is provided on the side of said ball-and-socket joint housing that is located opposite said joint opening and is closed by said closing element.

3. A ball-and-socket joint in accordance with claim 1, wherein said electronic component is arranged on the side of said closing element facing said joint ball.

4. A ball-and-socket joint in accordance with claim 1, further comprising: a protective element, by which said electronic component is covered, said protective element being provided at said closing element.

5. A ball-and-socket joint in accordance with claim 4, wherein said protective element is made of an electrically insulating material.

6. A ball-and-socket joint in accordance with claim 4, wherein said protective element is made of an electrically insulating plastic material injected directly on the said electronic component.

7. A ball-and-socket joint in accordance with claim 1, wherein said closing element is designed as an electronic printed circuit board itself, on which said electronic component is mounted.

8. A ball-and-socket joint in accordance with claim 7, wherein said closing element is made of a glass fiber-reinforced plastic.

9. A ball-and-socket joint in accordance with claim 1, wherein said sensor is integrated with said electronic component.

10. A ball-and-socket joint in accordance with claim 1, wherein said electronic component is an application specific integrated circuit.

11. A ball-and-socket joint in accordance with claim 1, further comprising: a plug electrically connected to said electronic component arranged on the side of said closing element facing away from said joint ball.

12. A ball-and-socket joint in accordance with claim 1, further comprising: a device coupled electrically to said electronic component for sending electromagnetic waves, arranged in said ball-and-socket joint.

13. A ball-and-socket joint in accordance with claim 1, further comprising: a device coupled electrically to said electronic component for receiving electromagnetic waves, arranged in said ball-and-socket joint.

14. A ball-and-socket joint in accordance with claim 1, wherein said housing forms an electromagnetic shield or a cooling body for said electronic component.

15. A ball-and-socket joint in accordance with claim 1, further comprising: at least one of a device coupled electrically to said electronic component for sending electromagnetic waves, arranged in said ball-and-socket joint and a device coupled electrically to said electronic component for receiving electromagnetic waves arranged in said ball-and-socket joint.

16. A ball-and-socket joint in accordance with claim 1, wherein a free space is provided between said closing element and said joint ball, said free space extending continuously and between said closing element and said joint ball or between said electronic component and said joint ball.

17. A ball-and-socket joint in accordance with claim 16, wherein said free space is filled with a lubricant.

18. A ball-and-socket joint comprising:
   a joint housing with a joint opening and with a mounting opening;

a ball pivot with a joint ball and a pivot pin, said ball pivot being mounted with said joint ball rotatably and pivotably disposed in said ball-and-socket joint housing with said pivot pin protruding through said joint opening from said ball-and-socket joint housing;

a closing element closing said mounting opening;

a protective element made of plastic disposed on a housing interior side of said closing element, facing said joint ball; and a plurality of electronic components covered by said protective element arranged on the housing interior side of said closing element, facing said joint ball, wherein said electronic components are arranged on a side of said closing element facing said protective element and said protective element is made of an electrically insulating material; wherein said closing element comprises an electronic printed circuit board with said electronic components formed on said circuit board or connected to said circuit board.

\* \* \* \* \*